United States Patent
Naaman

(10) Patent No.: US 12,062,827 B2
(45) Date of Patent: Aug. 13, 2024

(54) ATTENUATOR FOR QUBIT DRIVE SIGNALS

(71) Applicant: GOOGLE LLC, Mountain View, CA (US)

(72) Inventor: Ofer Naaman, Santa Barbara, CA (US)

(73) Assignee: Google LLC, Mountain View, CA (US)

( * ) Notice: Subject to any disclaimer, the term of this patent is extended or adjusted under 35 U.S.C. 154(b) by 359 days.

(21) Appl. No.: 17/297,178

(22) PCT Filed: Feb. 1, 2019

(86) PCT No.: PCT/US2019/016379
§ 371 (c)(1),
(2) Date: May 26, 2021

(87) PCT Pub. No.: WO2020/139407
PCT Pub. Date: Jul. 2, 2020

(65) Prior Publication Data
US 2022/0045416 A1   Feb. 10, 2022

Related U.S. Application Data

(60) Provisional application No. 62/785,938, filed on Dec. 28, 2018.

(51) Int. Cl.
*H01P 5/18* (2006.01)
*G06N 10/00* (2022.01)
*H01P 1/20* (2006.01)

(52) U.S. Cl.
CPC .............. *H01P 5/18* (2013.01); *G06N 10/00* (2019.01); *H01P 1/20* (2013.01)

(58) Field of Classification Search
CPC ...... H01P 5/18; H01P 1/20; H01P 1/22; H01P 1/2039
See application file for complete search history.

(56) References Cited

U.S. PATENT DOCUMENTS

| 4,013,981 A | 3/1977 | Sotokichi et al. |
| 2011/0140803 A1* | 6/2011 | Kim ............... H01P 1/20 |
| | | 333/110 |

(Continued)

FOREIGN PATENT DOCUMENTS

| CN | 1318902 | 10/2001 |
| CN | 103928732 | 7/2014 |
| EP | 1328038 | 7/2003 |

OTHER PUBLICATIONS

Office Action in Chinese Appln. No. 201980086341.6, dated Oct. 9, 2021, 16 pages (with English translation).

(Continued)

*Primary Examiner* — John W Poos
(74) *Attorney, Agent, or Firm* — Fish & Richardson P.C.

(57) ABSTRACT

An apparatus includes a directional coupler and an absorptive low pass filter, in which the directional coupler has a first transmission line extending from a first port to a second port and a second transmission line extending from a third port to a fourth port, the first transmission line and the second transmission line configured such that a portion of a signal travelling from the first port onto the first transmission line is coupled to the second transmission line and towards the third port. The second port is connected to the fourth port of the directional coupler via the absorptive low pass filter. When the signal is input into the first port of the directional coupler and output through the third port of the directional coupler, the signal is substantially unattenuated if the frequency of the signal is in a passband of the absorptive low pass filter.

22 Claims, 6 Drawing Sheets

(56) References Cited

U.S. PATENT DOCUMENTS

2015/0263406 A1* 9/2015 Ohashi .................. H01P 5/187
333/110
2017/0214109 A1* 7/2017 Ashida .................. H01P 5/187

OTHER PUBLICATIONS fr.com [online], "MMIC Reflectionless Filters," available on Mar. 28, 2016, via Internet Archive: Wayback Machine URL <https://web.archive.org/web/20160328094542/https:/www.minicircuits.com/pdfs/XHF-23+.pdf>, 5 pages.

Morgan et al., "Reflectionless Filter Structures," IEEE Transactions on Microwave Theory and Techniques, Apr. 2015, 63(4):1263-1271.

PCT International Search Report and Written Opinion in Appln. No. PCT/US2019/016379, dated Sep. 11, 2019, 11 pages.

Santavicca et al., "Impedance-matched low-pass stripline filters," Measurement Science and Technology, Jun. 2008, 19(8):087001.

Slichter et al., "Millikelvin thermal and electrical performance of lossy transmission line filters," CoRR, Mar. 2009, arxiv.org/abs/0903.1895v1, 4 pages.

Extended European Search Report in European Appln. No. 23165988. 9, mailed on Oct. 11, 2023, 12 pages.

Ishii, "Stepped Coupled-Line Low-Pass Filters" in Microwave Filters and Circuits: Contributions from Japan, Jan. 1970, 110-122.

Kringhoj, "Readout and Control of Semiconductor-Nanowire-based Superconducting Qubits" Thesis for the degree of Doctor of Quantum Physics, University of Copenhagen, Center for Quantum Devices, Jul. 2016, 54 pages.

Microwavejournal.com [online], "Reflectionless Filters Improve Linearity and Dynamic Range" Aug. 2015, retrieved on Mar. 12, 2019, retrieved from URL <https://www.microwavejournal.com/articles/24825-reflectionless-filters-improve-linearity-and-dynamic-range>, 12 pages.

* cited by examiner

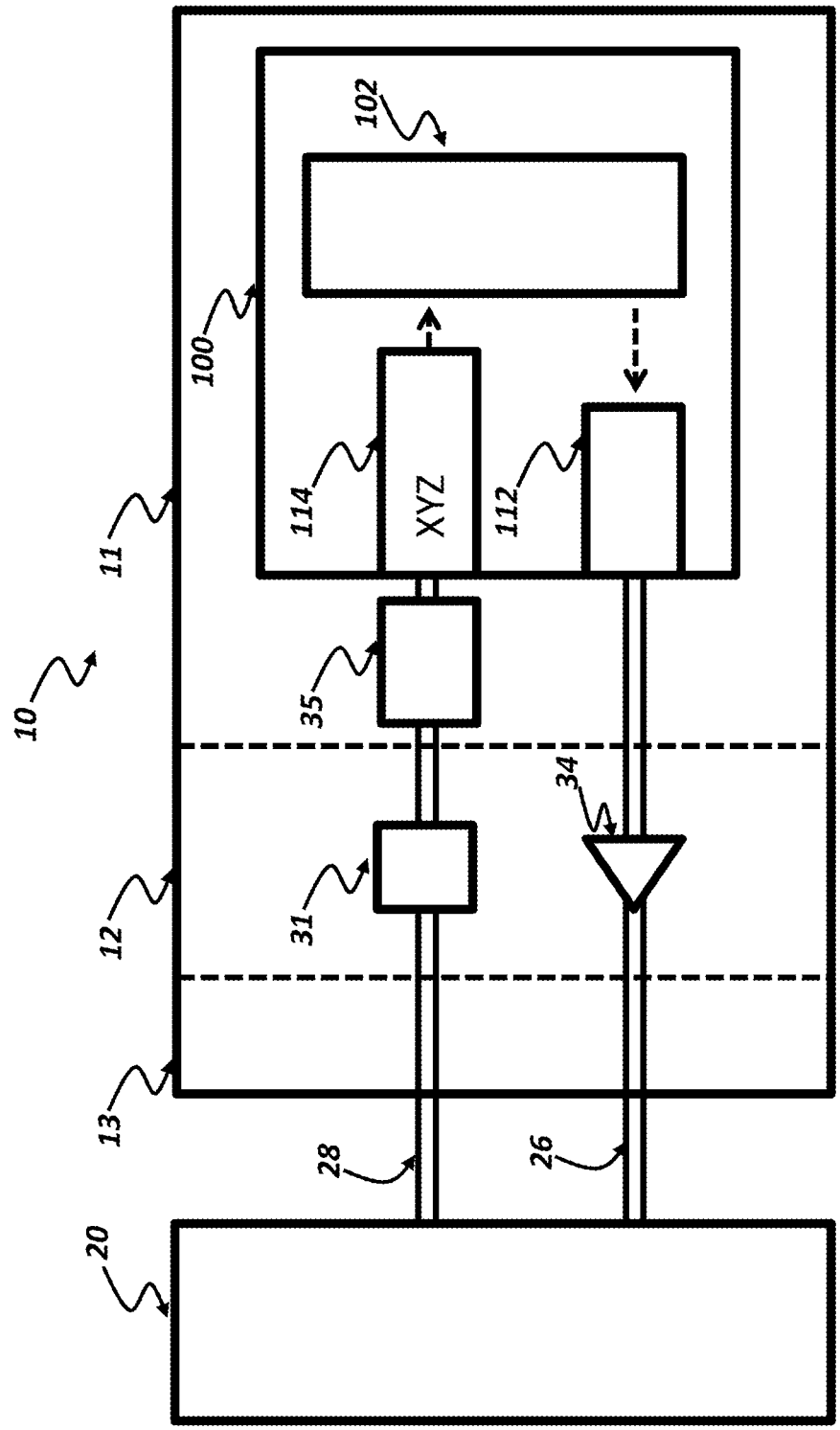

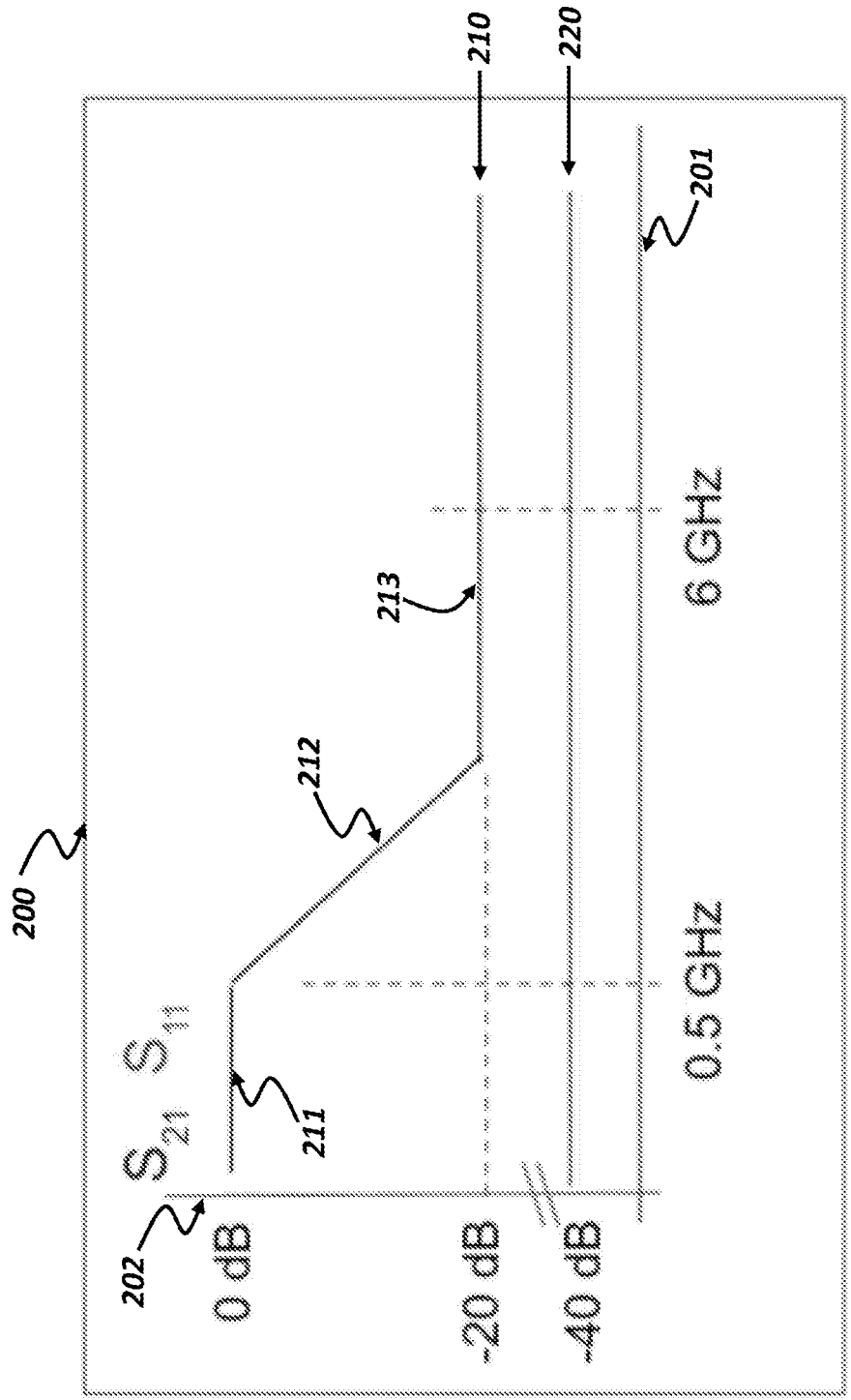

ATTENUATOR FOR QUBIT DRIVE SIGNALS

CROSS-REFERENCE TO RELATED APPLICATION

This application is a National Stage Application under 35 U.S.C. § 371 and claims the benefit of International Application No. PCT/US2019/016379, filed on Feb. 1, 2019, which claims priority to U.S. Provisional Application Ser. No. 62/785,938, filed on Dec. 28, 2018. The disclosures of the prior applications are considered part of, and are incorporated by reference in, the disclosure of this application.

TECHNICAL FIELD

This present subject matter relates to an attenuator for qubit drive signals.

BACKGROUND

Large-scale quantum computers have the potential to provide fast solutions to certain classes of difficult problems. Multiple challenges in the design and implementation of quantum architecture to control, program and maintain quantum hardware impede the realization of large-scale quantum computing.

SUMMARY

The present disclosure describes technologies for implementing a qubit control cable and an attenuator as part of the cable.

In general, one innovative aspect of the subject matter of the present disclosure may be embodied in an apparatus that includes: a directional coupler, and an absorptive low pass filter, wherein the directional coupler comprises a first transmission line extending from a first port to a second port and comprises a second transmission line extending from a third port to a fourth port, wherein the first transmission line and the second transmission line are configured such that a portion of a signal travelling from the first port onto the first transmission line is coupled to the second transmission line and towards the third port, and wherein the second port of the directional coupler is connected to the fourth port of the directional coupler via the absorptive low pass filter, such that when the signal is input into the first port of the directional coupler and output through the third port of the directional coupler, the signal is substantially unattenuated if the frequency of the signal is in a passband of the absorptive low pass filter and attenuated by a coupling parameter of the directional coupler if the frequency of the signal is in a stopband of the absorptive low pass filter and within a bandwidth of the directional coupler.

The foregoing and other implementations can each optionally include one or more of the following features, alone or in combination.

In some implementations, the absorptive filter is arranged such that the apparatus is substantially impedance-matched over all frequencies within the bandwidth of the directional coupler and such that a return loss of the apparatus is limited by a voltage standing wave ratio of the directional coupler.

In some implementations, the directional coupler is arranged such that the voltage standing wave ratio of the directional coupler is equal to or less than −26 dB.

In some implementations, the directional coupler is arranged such that the coupling parameter of the directional coupler is −20 dB, such that the signal in a second band of frequency is attenuated by 20 dB.

In some implementations, the second band is the bandwidth of the directional coupler.

In some implementations, the first band is from 0 to 2 GHz, and the second band is from 4 to 10 GHz.

In some implementations, an insertion loss of the directional coupler is equal to or less than 0.5 dB at all frequencies within the bandwidth of the directional coupler.

In some implementations, the directional coupler comprises a stripline directional coupler.

In some implementations, the absorptive low pass filter comprises a 50 Ohm stripline transmission line embedded in a microwave absorber material In some implementations, a magnetic loss tangent of the microwave absorber material increases with frequency.

In some implementations, a cutoff frequency of the absorptive low pass filter is determined by a length of the stripline transmission line and the magnetic loss tangent of the microwave absorber material.

In some implementations, the cutoff frequency of the absorptive low pass filter is 1 GHz.

In some implementations, the microwave absorber material provides −20 dB/cm attenuation in the stopband of the absorptive low pass filter.

In some implementations, the microwave absorber material comprises ferrite-based absorbers embedded in a silicone matrix material.

In some implementations, the apparatus further comprises an enclosure wherein the directional coupler and the absorptive low pass filter are embedded in the enclosure, and a first connector and a second connector ohmically connected to the input port and the coupled port of the directional coupler, respectively, for connecting to a printed circuit board (PCB), wherein the enclosure has a thermal conductivity larger than $10^{-5}$ W/m/K.

In some implementations, the enclosure comprises a first dielectric material, wherein the directional coupler is embedded in the first dielectric material, and a second dielectric material, wherein the absorptive low pass filter is embedded in the second dielectric material.

In some implementations, less than 1% of a power of the signal provided in the passband of the low pass filter is dissipated.

In some implementations, a quantum computing apparatus may be embodied that includes one or more frequency sources, a dilution refrigerator, a quantum processor and an apparatus described above, wherein the quantum processor and the apparatus are disposed within or in thermal equilibrium with a mixing chamber of the dilution refrigerator, and wherein the one or more frequency sources are connected to the quantum processor via the apparatus.

In some implementations, a method of using the apparatus may be embodied that includes inputting a signal into the input port of the directional coupler; and electrically connecting a load to the coupled port of the directional coupler.

In some implementations, the signal comprises a first signal and a second signal, and the frequency of the first signal is in the passband of the absorptive low pass filter and the frequency of the second signal is in the stopband of the absorptive low pass filter and within the bandwidth of the directional coupler.

In some implementations, the first signal is a qubit Z control signal, and the second signal is a qubit XY control signal.

In some implementations, the frequency of the first signal is between 0 to 2 GHz, and the frequency of the second signal is between 4 to 10 GHz.

In some implementations, the absorptive low pass filter comprises a material configured to absorb electromagnetic radiation having frequencies in the microwave range.

Using a single cable in place of two or more co-axial cables to provide the qubit control signal for a single qubit decreases the total number of cables used for interfacing the qubit through multiple stages of a dilution refrigerator. Combining XY control and Z control of a qubit into a single control line may also reduce a number of points of failure which can be present along the cables and in the interfaces.

An attenuator may be included in the unified cable, which may be designed to transmit the Z control signals with 0 dB attenuation, or substantially unattenuated, and to attenuate the XY control signals by a larger degree of attenuation, for example 20 dB. Therefore, for the XY control signals, the attenuator may act as a terminated absorptive filter. For the Z control signals, the attenuator may act as a low loss transmitter such that the attenuator does not generate heat from dissipating Z control signals.

The attenuator may be designed such that it is compatible with cryogenic temperatures and the number of components are minimised such that a plurality of attenuators may be mounted on a printed circuit board for high density integration.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1B is a schematic that illustrates an exemplary quantum computing system.

FIG. 2 is a plot illustrating an exemplary frequency response of an attenuator.

DETAILED DESCRIPTION

Figure 1A:
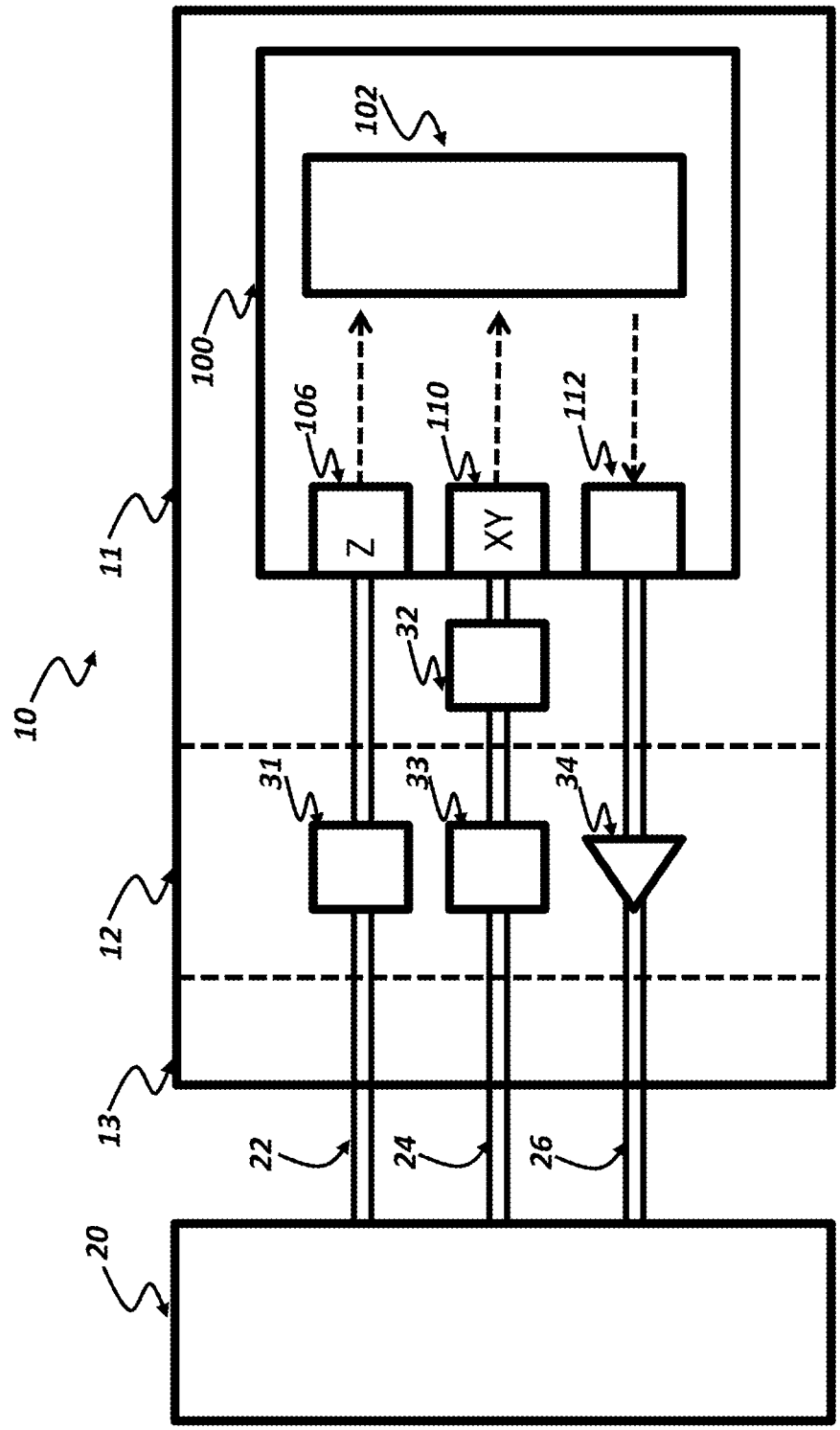
FIG. 1A is a schematic that illustrates an exemplary quantum computing system.

Quantum computing entails coherently processing quantum information stored in the quantum bits (qubits) of a quantum computer. Superconducting quantum computing is a promising implementation of solid-state quantum computing technology in which quantum information processing systems are formed, in part, from superconducting materials. To operate quantum information processing systems that employ solid-state quantum computing technology, such as superconducting qubits, the systems are maintained at extremely low temperatures, e.g., in the 10 s of mK. The extreme cooling of the systems keeps superconducting materials below their critical temperature and helps avoid unwanted state transitions. To maintain such low temperatures, the quantum information processing systems may be operated within a cryostat, such as a dilution refrigerator.

In some implementations, control signals are generated in higher-temperature environments, and are transmitted to the quantum information processing system using shielded impedance-controlled GHz capable transmission lines, such as coaxial cables. The cryostat may step down from room-temperature (e.g., about 300 K) to the operating temperature of the qubits in one or more intermediate cooling stages. For instance, the cryostat may employ a first stage maintained at a first temperature range that is colder than room temperature stage by one or two orders of magnitude, e.g., about 30-40 K or about 3-4 K, and warmer than the operating temperature for the qubits (e.g., about 10 mK or less).

Even at the extremely low qubit operating temperatures, qubits may still suffer from decoherence and gate errors. As such, large-scale quantum error correction algorithms can be deployed to compensate for the gate errors and qubit decoherence. An error-corrected quantum processor leverages redundancy to synthesize protected logical qubits from ensembles of error-prone qubits. While the required degree of redundancy depends on the error rates of the constituent qubits, in certain implementations, it is expected that at least 1,000 physical qubits may be required to realize a single error-corrected logical qubit. Implementations of current superconducting quantum systems use, e.g., at least two room-temperature co-axial cables per qubit to provide the qubit control signal. Moreover, to perform complex quantum computational problems, it is expected that upwards of 1,000 or more error-corrected logical qubits may be necessary. Using present systems, such scaling may require over millions of separate cables. Additionally, such a system would entail significant power consumption required to generate the control signals that drive the qubits of the quantum processor. As the number of qubits within a quantum computing chip increases, the space available for addressing and reading such qubits may become limited.

The present application relates to a qubit addressing scheme in which the XY and Z controls for each qubit are combined into a single XYZ control line. In this application, the term "XY control" refers to the manipulation of a qubit by affecting rotations of the qubit state via shaped microwave pulses. Also in this application the term "Z control" refers to the manipulation of a qubit by causing a change in the qubit frequency via DC pulses. This may relate to phase gates and in 2-qubit gates such as CNOT. Using a single cable in place of two or more co-axial cables to provide the qubit control signal for a single qubit decreases the total number of cables interfaced through the multiple stages of the dilution refrigerator. Combining the XY control and the Z control of a qubit into a single control line may also reduce a number of points of failure, which can be present along the cables and in the interfaces.

More specifically, the present application relates to an attenuator apparatus which is used to implement such single unified cable for controlling a qubit.

Prior to describing further details of the qubit control electronics, a brief review of a standard quantum computing system including the qubits, the quantum control elements, and quantum measurement is provided.

FIG. 1A is a schematic diagram that illustrates a quantum computing system. The quantum computing system includes a qubit chip 100 coupled to qubit control electronics 20. The qubit chip 100 includes one or more qubits 102, such as superconducting qubits, and may be operated using a final stage 11 of a cryostat 10 at extremely low temperatures (e.g., at around 10 mK or less, subject to the minimum possible temperature achievable by the cryostat, generally below 100 mK for a dilution refrigerator as the cryostat 10). The qubit control electronics 20 may be placed outside the cryostat 10, which may be at ambient condition.

For the purposes of this disclosure, the qubits operated by the qubit control electronics are assumed to be frequency tunable transmon (FT-XMON) qubits. However, the qubit control electronics described herein are not limited to working with transmon qubits and may also be used with other qubit configurations, such as fluxmon qubits, gmon qubits, or semiconductor qubits such as quantum-dots, among others.

The cryostat 10 may be a dilution refrigerator. However, as long as the cryostat 10 can provide a sufficiently low temperature for the coherence of the qubits 102, the exact type of the cryostat 10 is not limited to a dilution refrigerator. The final stage 11 of the cryostat 10 provides a lowest possible temperature the cryostat 10 is capable of providing. For example, in case the cryostat 10 is a dilution refrigerator, the final stage 11 may be a part of the cryostat that is thermally connected to the mixing chamber of the dilution refrigerator, which usually provides a temperature around 10 mK. Also in case the cryostat 10 is a dilution refrigerator, an intermediate stage 12 of the cryostat 10 may be a part of the cryostat that is thermally connected to a chamber including liquid Helium (He4) cooled to below room temperature but above the qubit operating temperature, e.g., at around 3-4K, or cooled by other means such as a pulse-tube cryocooler. The final stage 11 and the intermediate stage 12 of the cryostat 10 may be thermally enclosed within an initial stage 13 of the cryostat 10. The initial stage 13 may include parts of the cryostat 10 which provides an initial shielding from the room temperature condition. The initial shielding may include a vacuum shield or a liquid nitrogen shield and the rest of the components of the cryostat 10 such as vacuum systems and thermal shielding layers. This description of the cryostat 10 refers mainly to the common design of a dilution refrigerator. However, as discussed, the requirement from the cryostat is that it provides a sufficiently low temperature for the qubits to maintain a coherence time required for the operation. Therefore, the details of the design of the cryostat 10 may differ, such as the exact number of the stages, depending on the type of the cryostat 10 used.

Regardless of the type of the cryostat 10, the temperature gradient from the room temperature to the temperature at which the qubits 102 operate often raises considerable challenge in connecting the qubit control electronics 20 and the qubit chip 100. For brevity of the description, in the rest of the specification the cryostat 10 will be assumed to be a dilution refrigerator with the first stage 13, the intermediate stage 12, and the final stage 11.

Each qubit 102 of the qubit chip 100 may be coupled to a Z drive qubit circuit element 106 (e.g., an inductor), an XY drive qubit circuit element 110 (e.g., a capacitor), and a qubit readout resonator 112. There may be a plurality of Z drive qubit circuit elements 106, XY drive qubit circuit elements 110, and qubit readout resonators 112. Respective ones of these elements 106, 110, 112 may be provided to each of the qubits 102. Alternatively, one or more qubits may share one of these elements 106, 110, 112. The qubits 102 and associated circuit elements formed on the qubit chip 100 can be formed from patterned superconductor materials on a dielectric substrate (e.g., aluminum on a silicon or sapphire substrate).

The qubit chip 100 is coupled to the qubit control electronics 20, which are operated outside the cryostat 10, for example at room temperature (e.g., about 300 K). Data lines 22, 24, 26 that connect the control electronics 20 to the qubit chip 100 may pass through one or more low temperature stages of the cryostat 10, namely through the initial stage 13, the intermediate stage 12 and the final stage 11.

The data lines 22, 24, 26 may comprise at least one qubit Z control line 22, at least one qubit XY control line 24, and at least one qubit readout line 26 for each qubit.

The qubit 102 is a non-linear resonator with a resonance frequency in the microwave regime. For the case of a frequency tunable transmon (FT-XMON) qubit, the qubit 102 includes a capacitor in parallel with a pair of Josephson Junctions wired in a loop to form a SQUID whose effective inductance can be tuned by threading the loop with an external magnetic flux drive (e.g., provided by the qubit Z control line 22).

The control of the non-linearity of the qubit 102, therefore the tuning of the transition frequency of the qubit, can be carried out by generating a Z control signal at the control electronics 20 and then applying the Z control signal to the Z drive qubit circuit element 106.

Microwave gate operations on qubits, such as the qubits 102, can be carried out by generating an XY control signal at the control electronics 20 and then applying the XY control signal, when the qubit is operating at its resonant frequency, to the XY drive qubit circuit element 110, resulting in a deterministic rotation of the qubit state about an axis in the XY plane of the Bloch sphere, where the axis and angle of rotation are determined by the carrier phase and integrated envelope amplitude of the microwave signal, respectively. Exemplary pulse durations and envelope amplitudes, referenced to the XY-drive qubit circuit element 110, are 10-30 ns and 10-100 µV, respectively.

The qubit control electronics 20 may include standard control circuits operating at room temperature use high-speed (~1 GSPS or higher) and high-resolution (~14-bit) digital to analog converter (DAC) waveform generators to generate each qubit XY control signal and Z control signal.

FIG. 1A shows an exemplary arrangement of electronics components disposed within the cryostat 10 necessary for transmitting signals to control the qubits 102.

The data lines 22, 24, 26 may include a first attenuator 31, a second attenuator 32, and a third attenuator 33 and an amplifier 34. The first attenuator 31 may be disposed on the qubit Z-control line 22 in the intermediate stage 12. The third attenuator 33 may be disposed on the qubit XY-control line 24 in the intermediate stage 12. These attenuators are to suppress the noise from the qubit control electronics 20 disposed at room temperature (around 300K). In particular, 300K thermal noise (Johnson-Nyquist noise), generated from using resistance at room temperature and transmitted through the qubit Z-control line 22 and the qubit XY-control line 24, is attenuated.

The attenuators 31, 32, 33 may provide 20 dB attenuation or more. However, the exact degree of attenuation may depend on the exact parameters of the hardware.

The amplifier 34 may be disposed on the qubit readout line 26 in the intermediate stage 12, to amplify the readout signal from the qubit chip 100.

For the qubit XY control line 24, the second attenuator 32 may be disposed on the qubit XY control line 24 in the final stage 11. This is to further attenuate 300K thermal noise and to attenuate thermal noise at 3K generated from the third attenuator 33 in the intermediate stage 12 and the noise generated at the qubit control electronics 20 during digital-to-analogue conversion. The power of the XY control signal required at the qubits 102 is typically nW level. Typical control pulses at the qubit are ~1 nW with a duty cycle of ~20%. Therefore, disposing the second attenuator 32 at the final stage 11 and dissipating a power of 10's of nW level per qubit may be usually within the cooling capacity of the final stage 11 of a dilution fridge, which is a few microwatts. For the qubit Z control line 22, placing another attenuator in the final stage 11 is often not feasible because the current of the signal required for Z control is typically 1mA. Therefore, if a 20 dB attenuator is added at the final stage 11, a power on the order of 50 microwatts is dissipated per qubit. This leads to 5 mW power dissipation for 1000 qubits. Therefore, placing an attenuator to produce this level of power at the final stage 11 may generate heat comparable to or exceeding the cooling capacity of the final stage 11 of a dilution fridge. Further attenuation may be provided for the qubit Z control line 22 near the qubit control electronics 20 outside the cryostat 10. These problems may arise if the XY control line 24 and the Z control line 22 are combined into a single line.

Within the cryostat 10, the Z control signals (0-2 GHz) require smaller degree of attenuation than the XY control signals (4-10 GHz), typically by 20 dB. Therefore, if the Z control signals and the XY control signals are to be combined in a single cable, the single cable should satisfy these conditions, namely selectively attenuating the XY control signals by further 20 dB than the Z control signals.

In some implementations, even minute thermal dissipation of the Z control signals in the final stage 11 may generate heat comparable to the cooling power of the final stage 11. Accordingly, it may be advantageous to reduce the thermal dissipation of the Z control signals in the combined single cable.

To address the different attenuation requirements of the XY control signal and the Z control signal, an attenuator may be included in the unified cable, in which the attenuator is designed to transmit the Z control signals with 0 dB attenuation, or substantially unattenuated, and to attenuate the XY control signals by 20 dB.

The difference in the degree of attenuation, 20 dB, is not a fixed value but relates to the difference in power requirement for the Z control and the XY control signals. It was discussed above that the qubit XY control line 24 may have an additional attenuator, the second attenuator 32, compared to the qubit Z control line 22. The degree of attenuation in the high frequency region 213 mainly relates to this additional attenuation required for the qubit XY control line 24. This may depend on the specific design of the qubit and the specific mechanism for coupling of XY control and Z control signals to the qubits 102. For example, the temperature of the intermediate stage 12 may relate to the level of the Johnson noise transmitted via the qubit Z control line 22 to the final stage 13. If the qubit Z control line 22 is thermally anchored at the intermediate stage 12 at 3K and if the temperature of the final stage 13 is 30 mK, an 20 dB attenuation may be disposed at the intermediate stage 12 in consideration of the ratio of the two temperatures.

FIG. 1B shows an exemplary arrangement of the combined XY and Z control cable in use within the cryostat 10.

A single cable, or a unified XYZ-control line 28, combining the qubit Z control line 22 and the qubit XY control line 24, is used in place of the qubit Z control line 22 and the qubit XY control line 24 shown in FIG. 1A.

FIG. 1B shows that the XYZ control line 28 is connected from the qubit control electronics 20 to the qubit chip 100 and the attenuator 35 is disposed in the final stage 11, along with the first attenuator 31 in the intermediate stage 12. The present application relates to the implementation of such attenuator 35, which forms part of the single cable for combined XYZ control or may be disposed in the path of such cable for combined control. The XYZ control line 28 is connected to the qubits 102 via a XYZ drive qubit circuit element 114 on the qubit chip 100.

Preferably, the XY control signals and the Z control signals may be combined at the qubit control electronics 20. The combination of the XY control signals and the Z control signals may be achieved using a diplexer. Alternatively, the attenuator 35 may be arranged to accept as input the combination of the low frequency signals for the Z control and the high frequency signals for the XY control. Alternatively, the XY control signals and the Z control signals may be combined in the initial stage 13, or in the intermediate stage 12.

FIG. 1B shows that the attenuator 35 is disposed in the final stage 11 near the qubit chip 100 if the thermal dissipation is met by the cooling power of the final stage 11.

This arrangement is preferable because a standing wave, which may form due to the reflection from the qubit chip 100, more specifically from the XYZ drive qubit circuit element 114, can be minimized if the attenuator 35 is placed as close as possible to the qubit chip 100. Alternatively, the attenuator 35 may be placed in the final stage 11 along with the first attenuator 31 or the attenuator 35 may be placed in the intermediate stage 12 along with the first attenuator 31, if the thermal dissipation load of the control signals is within the cooling power of the respective stages.

In FIGS. 1A and 1B, other than the components described above, additional components may be used as appropriate in between the qubit chip 100 and the qubit control electronics 20.

FIG. 2 is a plot of required frequency response 200 of the attenuator 35. The horizontal axis 201 represents the frequency of the signals. In this example, it is assumed that the low frequency signals for the Z control of the qubits 102 are from 0 to about 0.5 GHz, and the high frequency signals for the XY control of the qubits 102 are from about 4 to about 10 GHz. However, the frequency bands of signals for the Z control and XY control may change depending on the design of the qubits 102.

The vertical axis 202 represents the intensity or power response of the attenuator. In particular, the vertical axis 202 represents the ratio, in units of Decibel, of the power input into the attenuator 35 and the power in the measured direction. The measured direction of the power may be either through the output of the attenuator 35 (transmission) or back out to the input of the attenuator 35 (reflection), as will be explained in more detail below.

The attenuator 35 may include two ports, port 1 and port 2. Throughout this application, the attenuator will be assumed to be a reciprocal device. In other words, the attenuator will provide the same result regardless of which port is used for input. Either one of the two ports can be used as an input and the other port can be used as an output if the attenuator 35 is reciprocal.

Following the convention of the two-port S-parameters, S21 corresponds to the degree of transmission of the attenuator 35. The frequency dependence of S21 is represented by a transmission curve 210.

The transmission curve 210 comprises three regions, a low frequency region 211, a high frequency region 213, and an intermediate frequency region 212. As discussed above, the low frequency region 211 represents the transmission characteristic of the attenuator in the frequency band for the Z control signals, and the high frequency region 213 represents the transmission characteristic of the attenuator in the frequency band for the XY control signals. The intermediate frequency region 212 corresponds to the region between the low frequency region 211 and the high frequency region 213. The transmission curve 210 shows that in the frequency band for the Z control signals, the attenuator 35 transmits the signal substantially unattenuated and in the frequency band for XY control signals, the attenuator attenuates the signal by 20 dB. The degree of attenuation, 20 dB, is not a fixed value but relates to the difference in power requirement for the Z control and the XY control signals, as explained above.

Although the frequency response of the high frequency region 213 remains flat over the whole of 4 to 10 GHz, the requirement of the flatness of this spectral response is set by the requirement on the pulse shape distortion due to the transfer function of the attenuator for the qubit XY control signals. For example, a pulse having 25 ns width spans roughly 40 MHz bandwidth in the frequency spectrum. If the spectral response of the high frequency region 213 is substantially flat within the 40 MHz band which overlaps the spectrum of the pulse, the pulse will not be distorted. If the spectral response of the high frequency region 213 within the 40 MHz band deviates from a flat response, the pulse will be distorted. The tolerance on the flatness of the spectral response may be determined by the tolerance on the distortion of the pulses. Therefore, although the frequency response of the high frequency region 213 is shown as uniform throughout the bandwidth 5 to 7 GHz, a slowly varying frequency response within this band will also be acceptable depending on the pulse width for the XY control signals.

Following the convention of the two-port S-parameters, S11, corresponds to the reflection characteristic of the attenuator 35. The frequency dependence of S11 is represented by a reflection curve 220. This represents the degree of reflection of the signal when incident into either port, port 1 or port 2, of the attenuator 35. Since the attenuator 35 may be placed between the qubit control electronics 20 and the qubit chip 100, S11, the reflection curve 220 relates to the degree of reflection of the signal back to the qubit control electronics due to the reflection off the input port and the extent to which standing waves form between the output port of the attenuator 35 and the qubit chip 100.

In order to combine the qubit XY control line 24 and the qubit Z control line 22, the attenuator 35 may be arranged to provide the attenuation characteristic shown by the transmission curve 210 and reflection curve 220 shown in FIG. 2.

The attenuator 35 may be a reflection-less filter which is perfectly impedance-matched over all frequencies, such that when the attenuator 35 is placed near the qubit chip 100, standing waves arising from reflections off the attenuator 35 and off the qubit chip 100 can be reduced and the reflection S11 at all frequencies negligibly small. Although the reflection curve 220 shows that the reflection is at −40 dB, this number is to be regarded as an exemplary value and to be made as low as possible. −20 dB corresponds to the current in the reflected pulse (VSWR) being 20% of the original. −40 dB corresponds to roughly 2%. Therefore, the target value of −40 dB sets the limit on the reflected current less than 2% (1:1.02 VSWR). However, the exact value of acceptable reflection will be dependent on the implementation of the qubit 102. In most commercial components, it is difficult to achieve a return loss value better than −30 dB.

A reactive low pass filter may be capable of providing the frequency response of the transmission curve 210 or S21, especially the low frequency region 211 and the intermediate region 212. However, a low pass filter alone may not be capable of providing the frequency response of the reflection curve 220 or S11. Furthermore, the flat frequency response in the high frequency region 213 may be important, depending on the timing and temporal widths of the control signals and in case a plurality of qubits operate at different resonance frequencies distributed over the high frequency region 213 but share the single design of the attenuator 35.

These issues can be addressed if the attenuator 35 is designed to include the combination of a low pass filter and a directional coupler.

Figure 3:
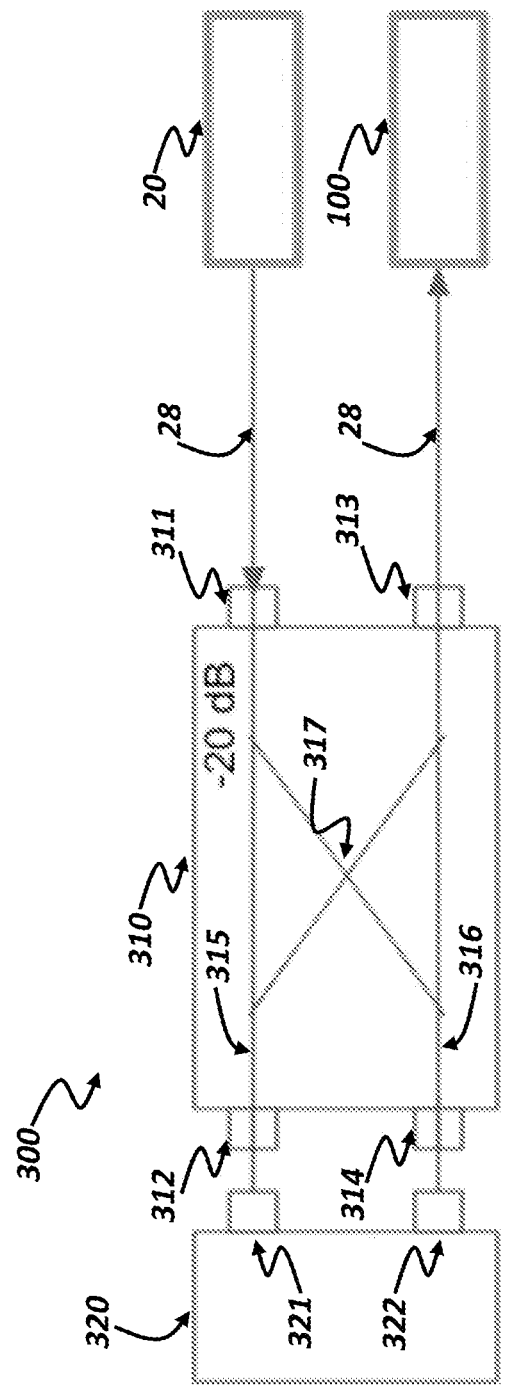
FIG. 3 is a schematic that illustrates a configuration of an exemplary attenuator.

FIG. 3 shows an exemplary implementation of an attenuator 300 described with reference to FIGS. 1B and 2.

The attenuator 300 comprises a directional coupler 310 and an absorptive low pass filter 320. The attenuator 300 corresponds to the attenuator 35 shown in FIG. 1B.

The directional coupler 310 comprises a first port 311, a second port 312, a third port 313, and a fourth port 314. The directional coupler 310 further comprises a first transmission line 315 extending from the first port 311 to the second port 312 and a second transmission line 316 extending from the third port 313 to the fourth port 314. The first transmission line 315 and the second transmission line 316 are coupled to one another via a coupler 317. Due to the coupler 317, a portion of a signal travelling in the first transmission line 315 is coupled to the second transmission line 316 and substantially the same portion of a signal travelling in the second transmission line 316 is coupled to the first transmission line 315, in case the directional coupler is a reciprocal device. In particular, a first predetermined fraction of a signal travelling in the first transmission line 315 from the first port 311 to the second port 312 is coupled to the second transmission line 316 towards the third port 313. The first predetermined fraction of a signal travelling in the first transmission line 315 from the second port 312 to the first port 311 is coupled to the second transmission line 316 towards the fourth port 314. Similarly, the first predetermined fraction of a signal travelling in the second transmission line 316 from the fourth port 314 to the third port 313 is coupled to the first transmission line 315 towards the second port 312. The first predetermined fraction of a signal travelling in the second transmission line 316 from the third port 313 to the fourth port 314 is coupled to the first transmission line 315 towards the first port 311. In this example, the first predetermined fraction of coupling of the signal by the coupler 317 may be −20 dB uniformly over the high frequency range 213.

The flat frequency response of the high frequency region 213, may be mainly provided by the frequency response of coupler 317 of the directional coupler.

The first predetermined fraction of coupling corresponds to the attenuation in the high frequency region 213 as will be explained in more detail below. Therefore, the first predetermined fraction of coupling, −20 dB, is not a fixed value but relates to the difference in power requirement for the Z control and the XY control signals. Therefore, the directional coupler 310 may be chosen or designed accordingly.

Depending on the type of the directional coupler 310, the degree of coupling at the coupler 317 of the directional coupler 310 may vary over frequency or have a finite bandwidth. The bandwidth over which the directional coupler 310 maintains a constant degree of coupling is often limited. The directional coupler 310 may be chosen or designed such that this bandwidth is wide enough so the attenuator 300 exhibits the frequency response in the high frequency region 213 within the tolerance as explained above.

These ports may be named according to the convention of the directional couplers. For example, the first port 311 may be called an "input port," the second port 312 may be called an "output port," the third port 313 may be called a "coupled port," and the fourth port 314 may be called an "isolated port." However, as discussed above, in case the directional coupler 310 is a reciprocal device, the operation of the attenuator 300 does not depend on the use of specific ports. In other words, any one of the four ports 311, 312, 313, 314 may be used as the input of the attenuator 300, as will be explained below.

The absorptive low pass filter 320 may act as a frequency filter which is arranged to provide a transmission curve 210 in the low frequency region 211 and the intermediate region 212.

The directional coupler 310 and the absorptive low pass filter 320 are connected to each other as follows.

The absorptive low pass filter 320 comprises a first port 321 and a second port 322. In order to form an attenuator 300, the first port 321 of the absorptive low pass filter 320 is connected to the second port 312 of the directional coupler 310, and the second port 322 of the absorptive low pass filter 320 is connected to the fourth port 314 of the directional coupler 310. Since the absorptive low pass filter 320 is a reciprocal device, the performance does not change if the two ports are exchanged in use. The first port 311 of the directional coupler 310 and the third port 313 of the directional coupler 310, which are not connected to the absorptive low pass filter 320, may be used as input and output ports. For the brevity of the description, the first port 311 of the directional coupler 310 will be used as an input port of the attenuator 300 and the third port 313 of the directional coupler 310 will be used as an output port of the attenuator 300 in the rest of the description.

For the XY control signals in the high frequency region 213, the attenuator 35 may act as a terminated absorptive filter, or an absorptive filter which minimizes reflection. For the Z control signals in the low frequency region 211, the attenuator 35 may act as a low loss transmitter.

In relation to the frequency response of the absorptive low pass filter 320 in the high frequency region 213, as in the case of a typical low pass filter, it may constantly decrease continuously from a high frequency end of the intermediate frequency region 212. The frequency response of the attenuator 300 in the high frequency region 213 may be mainly provided by the frequency response of the directional coupler 310.

In the high frequency region 213, the degree of attenuation of the absorptive low pass filter 320 is substantially greater than the degree of attenuation of the coupler 317 of the directional coupler 310. The frequency response of the high frequency region 213 may include the high frequency tail of the response of the absorptive low pass filter 320. Especially, near the crossover between the intermediate region 212 and the high frequency region 213 the contribution of the high frequency tail of the response of the absorptive low pass filter 320 may be non-negligible. Therefore, in practice, unlike the transmission curve 210 shown in FIG. 2, the contribution of the frequency response from the low pass filter 320 may be pronounced in the region between the intermediate region 212 and the high frequency region 213.

Ideally the attenuator 35 may exhibit zero reflection coefficient S11 at all frequencies including the low frequency region 211, the intermediate region 212, and the high frequency region 213. In this case, the attenuator 300 may be impedance-matched at all frequencies over the response of the attenuator 35. The low pass filter suitable for the attenuator 300 may be an absorptive type, which absorbs the signal in the stop band. In practice, the reflection coefficient S11 will be a finite value due to the reflection of the ports of the directional coupler 310. This is often quantified by the return loss of the directional coupler 310. When the attenuator 300 is connected to other components, the reflection coefficient S11 will be a finite value limited by the VSWR of the directional coupler 310 and the connectors, cables and the load connected to the attenuator 300. In some implementations, the VSWR of the directional coupler is kept such that the return loss is below −26 dB and the insertion loss below 0.5 dB. As discussed above, the −40 dB return loss is a desired target (2% reflection or 1:1.02 VSWR). The −26 dB return loss corresponds to 1:1.10 VSWR or 10% reflection and this value can be obtained with standard off-the-shelf connectors. The insertion loss number may be of less importance than the return loss since standard off-the-shelf components may be able to achieve 0.5 dB or better. Therefore, it is noted here that FIG. 2 depicts an idealized behavior of the attenuators 35, 300 and sets out target values.

In relation to the frequency response of the attenuator 300 in the low frequency region 211, the loss of the absorptive low pass filter 320 may be as low as possible, and the transmission of the directional coupler 310 may be as high as possible. In practice, the transmission coefficient S21 will be limited by the insertion loss of the directional coupler and the losses inherently present in the connectors and cables. Also in practice, the degree of coupling of the coupler 317 changes with frequency. Typically, the degree of coupling is weak at the low frequency region 211.

In the transition region 212, the input signal may propagate to the output port via two paths, leading to interference, which may cause distortion of the pulses of Z control signal. This can be mitigated in a variety of ways, including keeping the electrical path difference short, increasing the spectral separation between the low- and high-frequency regions, and making the low-pass region cutoff sharper.

FIG. 3 shows that the first port 311 of the directional coupler 310, used as an input port of the attenuator 300, is connected to the qubit control electronics 20 via the XYZ control line 28 and the third port 313 of the directional coupler 310, used as an output port of the attenuator 300, is connected to the qubit chip 100 via the XYZ control line 28. The qubit control electronics 20 transmit both the Z control signals and the XY control signals into the first port 311 of the directional coupler 310 via the XYZ control line 28. For example, in some implementations, the qubit control electronics 20 may transmit the Z control signal and the XY control signal simultaneously. Alternatively, the Z control signal may be sent separately in time from the XY control signal.

The Z control signals, upon entering the directional coupler 310 at the first port 311, may travel along the first transmission line 315 towards the second port 312 of the directional coupler 310 and enter the first port 321 of the absorptive low pass filter 320. The Z control signals may exit through the second port 322 of the absorptive low pass filter 320 into the fourth port 314 of the directional coupler 310. The Z control signals may undergo negligible or minimal possible attenuation within the absorptive low pass filter 320 as discussed above. The Z control signals may go on to travel through the second transmission line 316 towards the third port 313 of the directional coupler 310. Upon exiting the third port 313 of the directional coupler 310, the Z control signals reach the qubit chip 100 via the XYZ control line 28.

When the Z control signals enter the directional coupler 310 via the first port 311 of the directional coupler 310, the first predetermined fraction of the Z control signals may be coupled by the coupler 317 and travel towards the third port 313 of the directional coupler 310, then to the qubit chip 100. As discussed above, the low frequency Z control signals are coupled only weakly to the third port 313 of the directional coupler 310.

Therefore, the low frequency Z control signals from the control electronics 20 follow predominantly a single path through the directional coupler 310 to the filter 320 back to the coupler 310 to the qubit chip 100. In contrast, if portions of the Z control signals fall within the transition frequency range 212, those signals may follow two different paths upon entering first port 311 and ultimately interfere at port 313, which may cause an increase or a decrease in the transmitted signal based on the signal's frequency with different path lengths. The effect of the multipath interference in the transition region may manifest itself as distortion of the shape of the Z control pulse.

The XY control signal, upon entering the directional coupler 310, travels along the first transmission line 315 towards the second port 312 of the directional coupler 310 and enters the first port 321 of the absorptive low pass filter 320. The XY control signal is attenuated while travelling through the absorptive low pass filter 320. It is assumed that the XY control signals are attenuated entirely or substantially such that it is negligible within the absorptive low pass filter 320.

When the XY control signal enters the directional coupler 310 via the first port 311 of the directional coupler 310, the first predetermined fraction of the XY control signal may be coupled by the coupler 317 and travel towards the third port 313 of the directional coupler 310, then to the qubit chip 100.

Therefore, the XY control signal which arrive at the qubit chip 100 are substantially the ones which follow only the latter path. Although the XY control signal are attenuated at the absorptive low pass filter 320, thereby generating heat, the required power level of XY control signal may be within the cooling power of the stages 11, 12, 13 of the cryostat 10 the attenuator 300 is disposed on. This is because the power of the XY control signal required at the qubits 102 is typically nW level. Typical control pulses at the qubit are ~1 nW with a duty cycle of ~20%. Therefore, dissipating a power of 10's of nW level per qubit, may be usually within the cooling capacity of the final stage 11 of a dilution fridge, which is a few microwatts.

Figure 4:
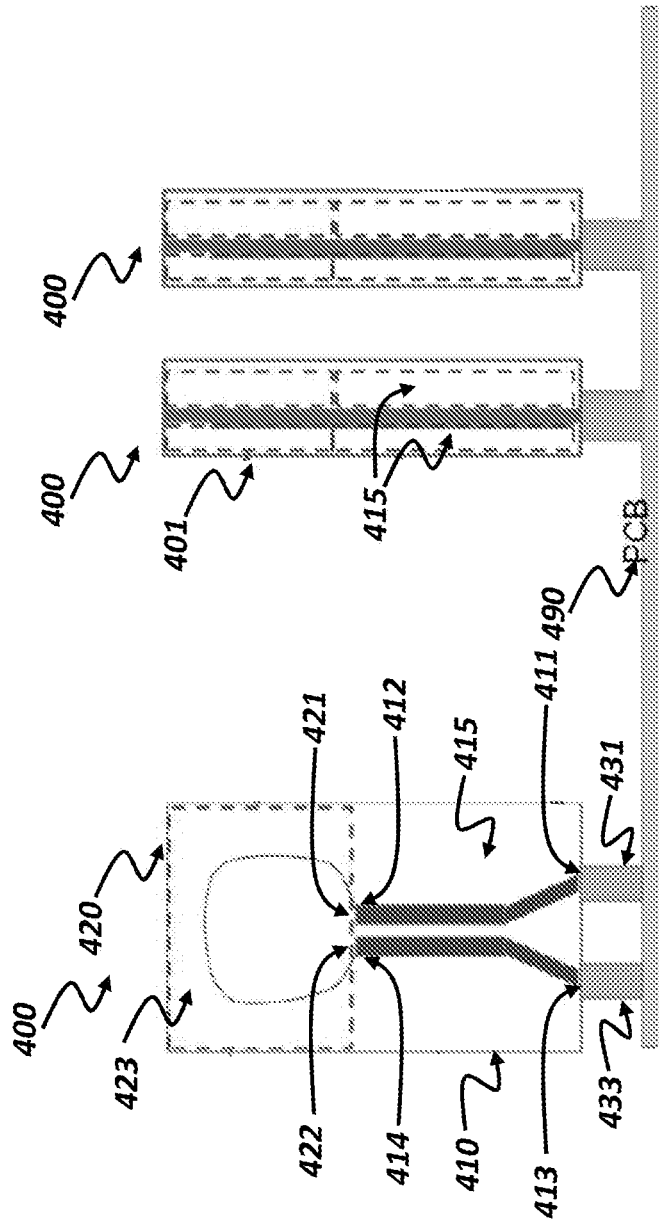
FIG. 4 is a schematic that illustrates an example of an attenuator.

FIG. 4 illustrates an exemplary construction of an integrated form of the attenuator 400 with references to FIGS. 1B, 2 and 3.

On the left of FIG. 4, a plan view of the attenuator 400 is shown. On the right of FIG. 4, a side view of two of the attenuators 400 is shown. Each of the attenuators 400 comprises a directional coupler 410 and an absorptive low pass filter 420, assembled to be integrated within an enclosure 401. The attenuators 400 may be mounted on a printed circuit board 490 (a PCB hereafter) for high density integration. The enclosure 401 may be thermally connected to one of the cryogenic stages 11, 12, 13 to remove the dissipated heat from the absorptive low pass filter 420. A thermal connection in this application refers to a material bridging between two parts, whose thermal conductivity is high enough such that thermal equilibrium is achieved between the two parts.

The directional coupler 410 may be implemented with stripline waveguides. The directional coupler can be designed with multiple sections with the goal of optimizing the coupler's VSWR, and its coupling parameter can be designed to give the desired attenuation for the high frequency region 213. As discussed above, the exemplary specifications of the directional coupler can be such that the first predetermined fraction is −20 dB, the return loss is smaller than 26 dB, the VSWR better than 1:1.1 and the bandwidth within which this fraction is maintained within an allowable tolerance, such as −3 dB off nominal, is between about 4 to about 10 GHz. However, VSWR may be improved as a trade off with a smaller bandwidth. The directional coupler 410 may comprise an input port 411 and an output port 413. The attenuator 400 may further include a first connector 431 and a second connector 433. The input port 411 and the output port 413 may be exposed at the boundary of the enclosure 401 such that they can be connected to the first connector 431 and the second connector 433, respectively. The attenuator 400 may be mounted on the PCB 490 via the first connector 431 and the second connector 433. The first connector 431 and the second connector 433 may be integrally formed with the enclosure 401 as part of the attenuator 400. Alternatively, the first connector 431 and the second connector 433 may be provided separately in order to connect to the PCB 490. Alternatively, the first connector 431 and the second connector 433 may respectively comprise mating connectors, one part on the enclosure 401 and the other part on the PCB 490.

The absorptive low pass filter 420 may be implemented with stripline waveguides embedded in an absorptive material 423.

In relation to design consideration of the absorptive low pass filter 420, a standard RC filter may be avoided for the absorptive low pass filter 420. A standard RC filter may provide a necessary frequency response of a low pass filter but may cause heating at the resistor by the Z control signals. A standard LC filter may also be avoided for the absorptive low pass filter 420. A standard LC filter may provide a required frequency response of a low pass filter and is substantially lossless. However, since an LC filter is highly reflective in the stopband, an LC filter may be a main cause of formation of standing waves between interfaces.

In obtaining a desired frequency response, namely that of a matched or reflectionless low pass filter discussed in FIG. 2, an absorptive filter component such as the Minicircuits XLF may be employed. However, these devices often do not operate at cryogenic temperatures due to manufacturing material choices. Alternatively, a combination of diplexers, attenuator, and low-pass filter may be assembled to realize a system with the overall desired response. However, such a system may be too large to be integrated within the limited space, especially in the final stage 13 of the cryostat 10. Using stripline waveguides embedded in the absorptive material 423 as the absorptive low pass filter 420 in combination with the coupled stripline waveguides as the directional coupler 410 can address these issues.

In relation to the absorptive material 423, assuming that the frequency response of the stripline waveguides forming the absorptive low pass filter 420 is uniform over the low frequency region 211 and the intermediate region 212, the absorptive material 423 may be any material which can provide the frequency response of the low frequency region 211 and the intermediate region 212 as described in FIG. 2, namely the response of a low pass filter. In other words, the frequency response of the absorptive low pass filter 320 in the low frequency region 211 and the intermediate region may be that of the absorptive material 423.

As discussed above, absorbing the signal in the stop band minimizes the reflection of the signal at the interfaces leading to an improvement in impedance matching. Also as discussed above, the contribution of the absorptive material 423 to the frequency response in the high frequency region 213 is substantially negligible, especially near the resonance frequency of the qubits 102, for example, near 6 GHz.

The absorptive material 423 may be a material which exhibits attenuation roughly linearly increasing with frequency and large magnetic loss tangent. For example, the loss tangent of the absorptive material 423 may be negligible up to about 1 GHz and then increase linearly with frequency. Examples of such material include commercially available Eccosorb® filter and IR filters. Eccosorb® material is often used for packaging material to suppress box resonances and for calibration of the blackbody radiation and as a thermal source.

A specific composition of the absorptive material 423 may be chosen to decide on the cutoff frequency, or the boundary between the low frequency region 211 and the intermediate region 212. The absorptive material 423 may be configured to absorb electromagnetic radiation having frequencies in the microwave range. The length of the stripline waveguide within the absorptive low pass filter 420 may be decided based on the degree of attenuation of the absorptive material 423 such that required degree of attenuation is achieved in the high frequency region 213 in the absorptive low pass filter 213. For example, the absorptive material 423 may be an Eccosorb® filter with −20 dB/cm attenuation in the high frequency region 213. For example, the size of the directional coupler 410 may be a quarter wavelength at the center frequency, therefore, about a few centimeters in length. The width of the attenuator 400, or the enclosure 401, may be determined by the size of the connectors, therefore up to a few centimeters. The absorptive low pass filter 420 may be about 2 centimeters long. Since the length of the stripline waveguide determines the degree of attenuation in frequency, the cutoff frequency of the absorptive low pass filter may be determined also by the length of the stripline waveguide, in addition to the magnetic loss tangent of the microwave absorber material.

The stripline waveguides used for the directional coupler 410 and the absorptive low pass filter 420 may be the same type such that the reflections are minimized at a first interface between a first port 421 of the absorptive low pass filter 420 and the second port 412 of the directional coupler 410, and at a second interface between the second port 422 of the absorptive low pass filter 420 and the fourth port 414 of the directional coupler 410. Alternatively, the directional coupler 410 and the absorptive low pass filter 420 may be integrally formed such that the stripline waveguides within the directional coupler 410 and the absorptive low pass filter 420 comprise continuous waveguides fabricated simultaneously.

Preferably, the stripline waveguides used for the directional coupler 410 and the absorptive low pass filter 420 have 50 Ohm impedance for impedance matching with conventional microwave devices, cables and components.

The stripline waveguides of the directional coupler 410 and the absorptive low pass filter 420 may be fabricated on or between flexible substrates such as films of polyimide, PEEK, polyester or polyethylene terephthalate. Flexible substrates for assembling electronic circuits are well known in the art and the flexible substrates to host the stripline waveguides are not limited to these examples.

Part of the stripline waveguides for the directional coupler 410 or the stripline waveguides of the directional coupler 410 may be laminated by being sandwiched with a dielectric laminate 415. The examples of the dielectric laminate 415 include commercially available PTFE composites reinforced with glass microfibers and hydrocarbon ceramic. Part of the stripline waveguides for the absorptive low pass filter 420 or the stripline waveguides of the absorptive low pass filter 420 may be laminated by being sandwiched with the absorptive material 423.

The external surface of the attenuator 400 may be covered with the enclosure 401. The enclosure may substantially cover the surface of the attenuator 400 except for the connection of the input port 411 and the output port 413 with the first connector 431 and the second connector 433, respectively. The enclosure 401 may comprise a conductive material such that the enclosure 401 may serve as an electrical ground for the stripline waveguides for the directional coupler 410 and the absorptive low pass filter 420. The enclosure 401 may comprise a thermally conducting material such that the enclosure 401 may be thermally connected to any one of the stages 11, 12, 13 of the cryostat 10 for cooling. The enclosure 401 may be formed by an electrodeposited copper or reverse treated electrodeposited copper on the sides of the dielectric laminate 415.

Figure 5:
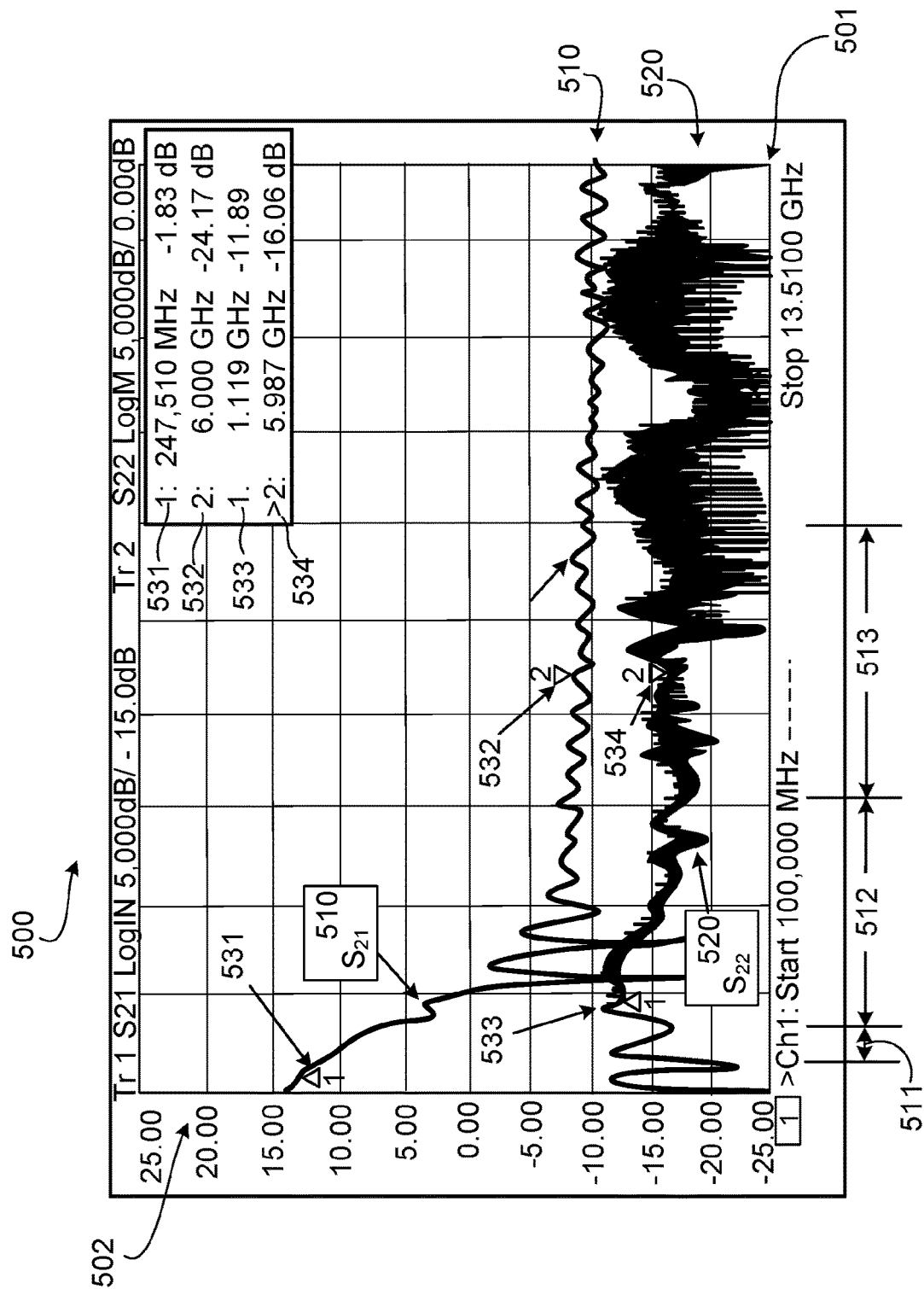
FIG. 5 is a measurement result of frequency response of an attenuator.

FIG. 5 shows a plot 500 of a measurement result of frequency response of a prototype of the attenuator 400 with references to FIGS. 3 and 4. The prototype was built from discrete components with coax cable interconnects to confirm the working principle as described in FIG. 3. The directional coupler 310 used was a commercially available part from Marki Microwave. The absorptive low pass filter 320 used was custom built filter cladded with the Eccosorb material.

A vertical axis 502 represents the intensity or power response of the attenuator. Each division in the vertical axis 502 corresponds to 5 dB.

A horizontal axis 501 represents the frequency of the signals. The horizontal axis 501 is plotted from 100 MHz to 13.51 GHz. Each division corresponds to 1.35 GHz.

A transmission data 510, also marked S21, represents the test data taken from measuring transmission from the input port 311 to the output port 313 over the frequency range of the horizontal axis 501. For the transmission data 510, the numbers on the vertical axis 502 are offset by 15 dB for display. A first marker 531 and a second marker 532 show measurement values normalized to the network analyzer calibration. Each measurement value is referenced to this value obtained from a through calibration of the network analyser and the cables being used. The first marker 531 indicates the data at 247.51 MHz, which is −1.83 dB. The second marker 532 indicates the data at 6 GHz, which is −24.17 dB.

The transmission data 510 may be divided into three regions, a low frequency region 511, a high frequency region 513, and an intermediate frequency region 512. In this example, a cutoff point (3 dB point) of the absorptive low pass filter 320 is around 500 MHz. The low frequency region 511 may be from DC to 500 MHz. As discussed above, the frequency response of the low frequency region 511 is determined mainly by the choice of the absorptive material 423 and corresponds to the frequency band for Z control signals. The high frequency region 513 may be from 4 to 8 GHz, where the resonance frequencies of the qubits 102 may reside and therefore where the XY control signals are. This corresponds to roughly 4th to 6th division in the plot 500. The intermediate frequency region 512 is between the low frequency region 511 and the high frequency region 513.

The degree of attenuation in the high frequency region 513 is substantially level. The second marker 532, which represents roughly the median value of the high frequency region 513, shows that the degree of attenuation is −24.17 dB. Considering the degree of attenuation at the end point of the low frequency region 511, the degree of attenuation is 21.17 dB. As discussed above, this degree of attenuation is provided by the first predetermined value of the directional coupler 310 and relates to the difference in power requirement for the Z control and the XY control signals.

In the intermediate frequency region 512, the transmission data 510 exhibits a large ripple. This is due to the interference between different signal paths within the attenuator 300, such as one going through the absorptive low pass filter 320 and the other not going through the absorptive low pass filter 320.

In the high frequency region 513, the transmission data 510 exhibits some ripple. This is due to the standing wave formed within the coaxial cable disposed between the second port 322 of the absorptive low pass filter 320 and the fourth port 314 of the directional coupler 310.

A reflection data 520, also marked S22, represents the test data taken from measuring reflection from the input port 311 or the output port 313 over the frequency range of the horizontal axis 501. Since the attenuator 300 is a reciprocal device, S11 and S22 would correspond to the same quantity. For the reflection data 520, the numbers on the vertical axis 502 represent the degree of reflection in the units of Decibel. A third marker 533 and a fourth marker 534 show the power with respect to the calibration of the network analyser. The third marker 533 indicates the data at 1.119 GHz, which is −11.89 dB. The fourth marker 534 indicates the data at 5.987 GHz, which is −16.06 dB.

The attenuator 400 may be a reflection-less filter which is perfectly impedance-matched over all frequencies and the reflection S11 at all frequencies is negligibly small. Here, the fourth marker 534 indicates that the degree of reflection is −16.06 dB. This value is limited by VSWR of the directional coupler 410, roughly 1:1.2 and the VSWR of the connectors and cables.

As discussed above, there can be a trade-off between the VSWR and the bandwidth of a directional coupler. Therefore, the design of the directional coupler 410 may be further modified to improve the VSWR at the cost of a reduced bandwidth.

The attenuation of the low frequency signals may be finite due to the insertion loss and the return loss of the directional coupler 310. Similarly, although the attenuator 300 is designed such that it is impedance matched at all frequencies within the bandwidth of the directional coupler, finite impedance mismatch is present due to the return loss of the directional coupler 310.

Implementations of the quantum subject matter and quantum operations described in this specification can be implemented in suitable quantum circuitry or, more generally, quantum computational systems, also referred to as quantum information processing systems, including the structures disclosed in this specification and their structural equivalents, or in combinations of one or more of them. The terms "quantum computational systems" and "quantum information processing systems" may include, but are not limited to, quantum computers, quantum cryptography systems, topological quantum computers, or quantum simulators.

The terms quantum information and quantum data refer to information or data that is carried by, held or stored in quantum systems, where the smallest non-trivial system is a qubit, e.g., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In some implementations the computational basis states are identified with the ground and first excited states, however it is understood that other setups where the computational states are identified with higher level excited states are possible. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillators, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

Fabrication of the quantum circuit elements and classical circuit elements described herein can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of about 1.2 kelvin), indium (superconducting critical temperature of about 3.4 kelvin), NbTi (superconducting critical temperature of about 10 kelvin) and niobium (superconducting critical temperature of about 9.3 kelvin). Accordingly, superconducting structures, such as superconducting traces and superconducting ground planes, are formed from material that exhibits superconducting properties at or below a superconducting critical temperature.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. For example, the actions recited in the claims can be performed in a different order and still achieve desirable results. In certain circumstances, multitasking and parallel processing may be advantageous. Moreover, the separation of various components in the implementations described above should not be understood as requiring such separation in all implementations.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:
a directional coupler; and
an absorptive low pass filter,
wherein the directional coupler comprises a first transmission line extending from a first port to a second port and comprises a second transmission line extending from a third port to a fourth port,
wherein the first transmission line and the second transmission line are configured such that a portion of a signal travelling from the first port onto the first transmission line is coupled to the second transmission line and towards the third port, and
wherein the second port of the directional coupler is connected to the fourth port of the directional coupler via the absorptive low pass filter, such that when the signal is input into the first port of the directional coupler and output through the third port of the directional coupler, the signal is substantially unattenuated if the frequency of the signal is in a passband of the absorptive low pass filter and attenuated by a coupling parameter of the directional coupler if the frequency of the signal is in a stopband of the absorptive low pass filter and within a bandwidth of the directional coupler.

2. The apparatus of claim 1,
wherein the absorptive low pass filter is arranged such that the apparatus is substantially impedance-matched over all frequencies within the bandwidth of the directional coupler and such that a return loss of the apparatus is limited by a voltage standing wave ratio of the directional coupler.

3. The apparatus of claim 2,
wherein the directional coupler is arranged such that the voltage standing wave ratio of the directional coupler is equal to or less than −26 dB.

4. The apparatus of claim 1,
wherein the directional coupler is arranged such that the coupling parameter of the directional coupler is −20 dB, such that the signal in a second band of frequency is attenuated by 20 dB.

5. The apparatus of claim 4,
wherein the second band is the bandwidth of the directional coupler.

6. The apparatus of claim 4,
wherein the passband is from 0 to 2 GHz, and the second band is from 4 to 10 GHz.

7. The apparatus of claim 1,
wherein an insertion loss of the directional coupler is equal to or less than 0.5 dB at all frequencies within the bandwidth of the directional coupler.

8. The apparatus of claim 1,
wherein the directional coupler comprises a stripline directional coupler.

9. The apparatus of claim 1,
wherein the absorptive low pass filter comprises a 50 Ohm stripline transmission line embedded in a microwave absorber material.

10. The apparatus of claim 9,
wherein a magnetic loss tangent of the microwave absorber material increases with frequency.

11. The apparatus of claim 9,
wherein a cutoff frequency of the absorptive low pass filter is determined by a length of the stripline transmission line and the magnetic loss tangent of the microwave absorber material.

12. The apparatus of claim 11,
wherein the cutoff frequency of the absorptive low pass filter is 1 GHz.

13. The apparatus of claim 9,
wherein the microwave absorber material provides −20 dB/cm attenuation in the stopband of the absorptive low pass filter.

14. The apparatus of claim 9,
wherein the microwave absorber material comprises ferrite-based absorbers embedded in a silicone matrix material.

15. The apparatus of claim 1, further comprising:
an enclosure wherein the directional coupler and the absorptive low pass filter are embedded in the enclosure; and
a first connector and a second connector ohmically connected to the first port and the third port of the directional coupler, respectively, for connecting to a printed circuit board (PCB),
wherein the enclosure has a thermal conductivity larger than $10^{-5}$ W/m/K.

16. The apparatus of claim 15,
wherein the enclosure comprises:
a first dielectric material, wherein the directional coupler is embedded in the first dielectric material, and
a second dielectric material, wherein the absorptive low pass filter is embedded in the second dielectric material.

17. The apparatus of claim 1,
wherein less than 1% of a power of the signal provided in the passband of the absorptive low pass filter is dissipated.

18. A method of using the apparatus of claim 1, comprising:
inputting a signal into the first port of the directional coupler; and
electrically connecting a load to the third port of the directional coupler.

19. The method of claim 18,
wherein the signal comprises a first signal and a second signal, and
wherein the frequency of the first signal is in the passband of the absorptive low pass filter and the frequency of the second signal is in the stopband of the absorptive low pass filter and within the bandwidth of the directional coupler.

20. The method of claim 19,
wherein the first signal is a qubit Z control signal, and the second signal is a qubit XY control signal.

21. The method of claim 19,
wherein the frequency of the first signal is between 0 to 2 GHz, and the frequency of the second signal is between 4 to 10 GHz.

22. The apparatus of claim 1, wherein the absorptive low pass filter comprises a material configured to absorb electromagnetic radiation having frequencies in the microwave range.

* * * * *